(12) United States Patent
Wolske

(10) Patent No.: US 7,180,067 B2
(45) Date of Patent: Feb. 20, 2007

(54) INFRARED IMAGING SYSTEM WITH ELLIPSOID REFLECTIVE WARM BAFFLE AND METHOD

(75) Inventor: Jeff S. Wolske, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 229 days.

(21) Appl. No.: 11/059,159

(22) Filed: Feb. 15, 2005

(65) Prior Publication Data

US 2006/0180765 A1 Aug. 17, 2006

(51) Int. Cl.
*G01J 5/02* (2006.01)
*G02B 5/08* (2006.01)
*G02B 5/10* (2006.01)

(52) U.S. Cl. .................... 250/353; 250/352; 359/351
(58) Field of Classification Search ................ 359/351; 250/352, 353
See application file for complete search history.

(56) References Cited

U.S. PATENT DOCUMENTS

| | | | |
|---|---|---|---|
| 4,217,026 A * | 8/1980 | Radovich ................ 359/611 |
| 4,542,963 A * | 9/1985 | Linlor .................... 359/399 |
| 4,820,923 A * | 4/1989 | Wellman ................. 250/352 |
| 4,990,782 A * | 2/1991 | Wellman et al. .......... 250/352 |
| 5,225,931 A * | 7/1993 | Stavroudis .............. 359/601 |
| 5,298,752 A * | 3/1994 | Wight .................... 250/352 |
| 5,382,797 A * | 1/1995 | Kunimoto et al. ........ 250/352 |
| 6,677,588 B1 * | 1/2004 | Granneman ............. 250/338.1 |
| 6,969,840 B1 * | 11/2005 | Theriault et al. ........ 250/216 |
| 7,002,154 B2 * | 2/2006 | Wellman et al. .......... 250/352 |

* cited by examiner

*Primary Examiner*—David Porta
*Assistant Examiner*—Frederick F. Rosenberger
(74) *Attorney, Agent, or Firm*—Thomas J. Finn; Leonard A. Alkov; Kari A. Vick

(57) ABSTRACT

An infrared imaging system uses an uncooled elliptical surface section between reflective surfaces to allow a detector to perceive a cold interior of a vacuum chamber rather than a warmer surface of a structure or housing. In this way, background infrared radiation from within the system may be minimized.

19 Claims, 2 Drawing Sheets

INFRARED IMAGING SYSTEM WITH ELLIPSOID REFLECTIVE WARM BAFFLE AND METHOD

GOVERNMENT RIGHTS

This invention was made, at least in part, with Government support under Contract [insert contract number] awarded by the United States [insert agency]. The Government may have certain rights in this invention.

TECHNICAL FIELD

Some embodiments of the present invention pertain to optical systems, some embodiments pertain to infrared imaging systems, and some embodiments pertain to infrared telescopes.

BACKGROUND

Aperture stops in optical systems are used to define the largest bundle of rays from the scene that can pass through the system. In infrared imaging systems that view cold backgrounds, it is important that warm infrared radiation emitted from the aperture stop and other internal system elements do not contribute to the infrared signal that the detector "sees" from the intended scene. The unwanted signal from such an aperture stop and from warm internal structures inside the optical system is sometimes referred to as self emission or background infrared radiation. If this background infrared radiation is too high, an infrared imaging system may not be able to detect or discriminate faint targets against scenes with cold backgrounds.

Some conventional infrared imaging systems use cooled surfaces such as "cold shields" or "cold stops" to limit the contribution of background infrared radiation internal to the system. However the cooling mechanisms required to cool these surfaces are often costly, add unwanted weight and complexity, and cannot be easily incorporated due to space and packaging constraints. Thus there are general needs for methods and infrared imaging systems that reduce the detection of background infrared radiation from the system's internal sources.

SUMMARY

An infrared imaging system uses an uncooled elliptical surface between reflective surfaces to allow a detector to perceive a cold interior of a vacuum chamber rather than a warmer internal structure or housing. In this way, background infrared radiation may be minimized.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
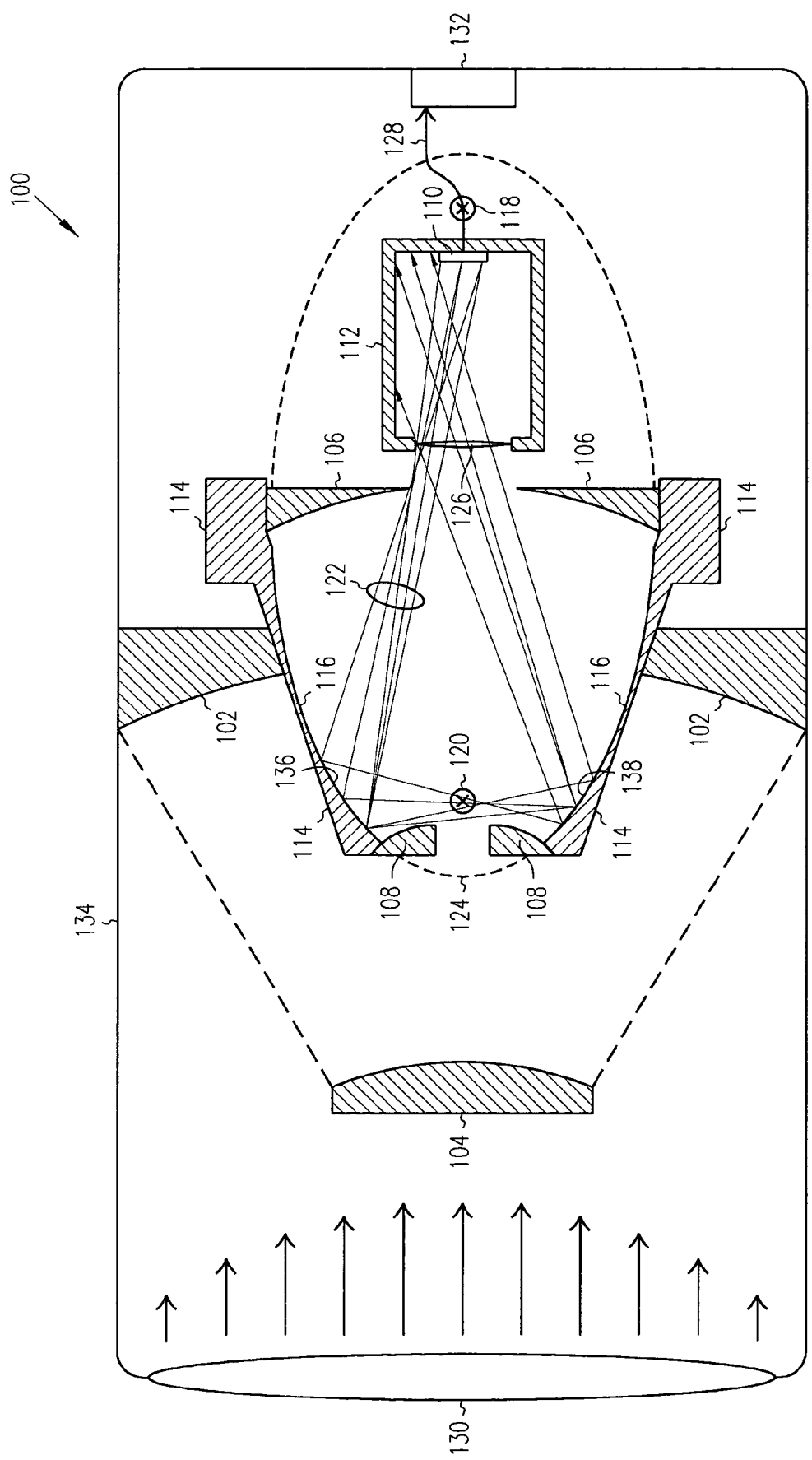
FIG. 1 illustrates an infrared imaging system in accordance with some embodiments of the present invention.

FIG. 1 illustrates an infrared imaging system in accordance with some embodiments of the present invention. FIG. 1 is a two-dimensional cross-sectional view of infrared imaging system 100. Infrared imaging system 100 comprises infrared detector 110 within a vacuum chamber 112, which may be adapted to be cooled to at or near cryogenic temperatures. Infrared imaging system 100 also comprises a plurality of reflective surfaces 102, 104, 106 and 108 to provide an optical path to detector 10. Infrared imaging system 100 also comprises housing 114 to couple reflective surfaces 106 & 108. In accordance with embodiments, housing 114 has uncooled elliptical surface section 116 between reflective surfaces 106 & 108. In this way, backward-traced rays emanating from detector 110 are reflected off elliptical surface section 116 and into an interior of vacuum chamber 112. This may allow detector 110 to perceive infrared radiation from the cold interior of vacuum chamber 112 rather than warmer infrared radiation from housing 114. In these embodiments, detector 110 may perceive a cold and unfocused background rather than a warm surface of housing 114 or structure 134.

In some embodiments, the reflective surfaces comprise primary 102, secondary 104, tertiary 106 and quaternary 108 reflective surfaces to provide the optical path from entrance aperture 130 to detector 110. In these embodiments, elliptical surface section 116 may be disposed between tertiary and quaternary surfaces 106 & 108. In some of these embodiments, infrared imaging system 100 may be a four-mirror infrared telescope, although the scope of the invention is not limited in this respect.

In accordance with embodiments, elliptical surface section 116 is not part of the optical path that primary 102, secondary 104, tertiary 106 and quaternary 108 comprise. In other words, in four-mirror infrared imaging system or telescope embodiments, elliptical surface section 116 is not one of the four mirrored surfaces used for perceiving images through entrance aperture 130, however elliptical surface section 116 helps minimize self-emissions of housing 114 or structure 134 to help detector 110 distinguish warmer objects from cooler objects in a scene, particularly when the scene has a cold background.

In some embodiments, elliptical surface section 116 is part of an ellipsoid 124 illustrated by a dashed line. Ellipsoid may be defined by originating focus 118 and opposing focus 120. In some embodiments, originating focus 118 of ellipsoid 124 is behind and offset from a surface of detector 110 and opposing focus 120 of ellipsoid 124 is in front of and close to quaternary surface 108 as shown. In some embodiments, elliptical surface section 116 may be substantially or approximately elliptical.

In some embodiments, due to properties of elliptical surface section 116, infrared emissions from elliptical surface section 116 perceived by detector 110 are reflected to an interior of vacuum chamber 112 to allow the detector 110 to perceive the interior of vacuum chamber 112 rather infrared emissions of housing 114 or structure 134.

In some embodiments, reflective surfaces 102, 104, 106 and 108, elliptical surface section 116, focuses 118 and 120, and vacuum chamber opening 126 are positioned such that one or more rays 122 emanating from detector 110 (e.g., back-trace rays) that extend to elliptical surface section 116 are reflected from a first portion 136 of elliptical surface section 116 to a second portion 138 of elliptical surface section 116. Because of the elliptical properties of surface section 116, rays 122 are then redirected toward originating focus 118 (but not necessarily directly at the originating focus 118). Rays 122 are then intercepted by the interior of vacuum chamber 112 rather than detector 110. This allows detector 110 to perceive the interior of vacuum chamber 112 which may be perceived as a background that is cold and unfocused. In some embodiments, vacuum chamber opening 126 may comprise glass or other material that passes infrared radiation while maintaining a vacuum seal for vacuum chamber 112.

In some embodiments, vacuum chamber 112 comprises a Dewar that is adapted to be cooled to either at or near cryogenic temperatures. In some embodiments, vacuum chamber 112 maintains the infrared detector 110 at or near a cryogenic temperature. In some embodiments, detector 110 may comprise a focal plane array (FPA) for detection of infrared energy, although the scope of the invention is not limited in this respect.

In some embodiments, the reflective surfaces 102, 104, 106 and 108 and elliptical surface section 116 are infrared reflective surfaces comprising gold, silver or aluminum plating, however other infrared reflective materials may also be suitable. In some embodiments, structure 134 and/or housing 114 may comprise either aluminum or beryllium, although the scope of the invention is not limited in this respect.

In some embodiments, reflective surfaces 102, 104, 106 and 108 comprise sections of substantially spherical surfaces. In some other embodiments, primary 102, secondary 104, tertiary 106 and quaternary 108 reflective surfaces may comprise conic or aspherical sections, although the scope of the invention is not limited in this respect.

In some embodiments, detector 110 generates output signals 128 representing infrared images of a scene perceived through entrance aperture 130. In these embodiments, circuitry 132 may be provided output signals 128 for analysis for use in identifying and distinguishing targets in the scene from a background. In some embodiments, a target's temperature, shape and/or size may be determined from output signals 128. In some embodiments, output signals 128 may be provided to a ground-based system, although the scope of the invention is not limited in this respect.

In some embodiments, system 100 may comprise an infrared target detection and identification system. In these embodiments, an infrared imaging system may generate detection output signals 128 from infrared radiation detected from a scene. Circuitry 132 may identify and distinguish targets in the scene from a cold background based on output signals 128.

Some embodiments of the present invention relate to commercial satellite imaging systems. Some embodiments of the present invention relate to space-based long-wave infrared (LWIR) missile defense systems.

As can be seen, embodiments of the invention use the unique properties of an elliptical surface wherein rays, such as rays 122, originating from a first focus reflect off elliptical surface section 116 and through a second focus. These rays would continue through the second focus and reflect again off the opposite side of elliptical surface and back to the first focus. In some embodiments, elliptical surface section 116 may comprise a section of a single ellipsoid of revolution. In these embodiments, the section may provide a reflective baffle to allow detector 110 to perceive the interior of a Dewar as a cold and unfocused background for those areas outside the intended scene.

The use of reflective baffling to reflect a cold surface (i.e., one that is cold anyway during operation) as background, results in no additional cryogenic demands on the system. Furthermore, the low-profile design of the reflective baffle may reduce the amount of clipping or vignetting of object rays through the system.

Figure 2:
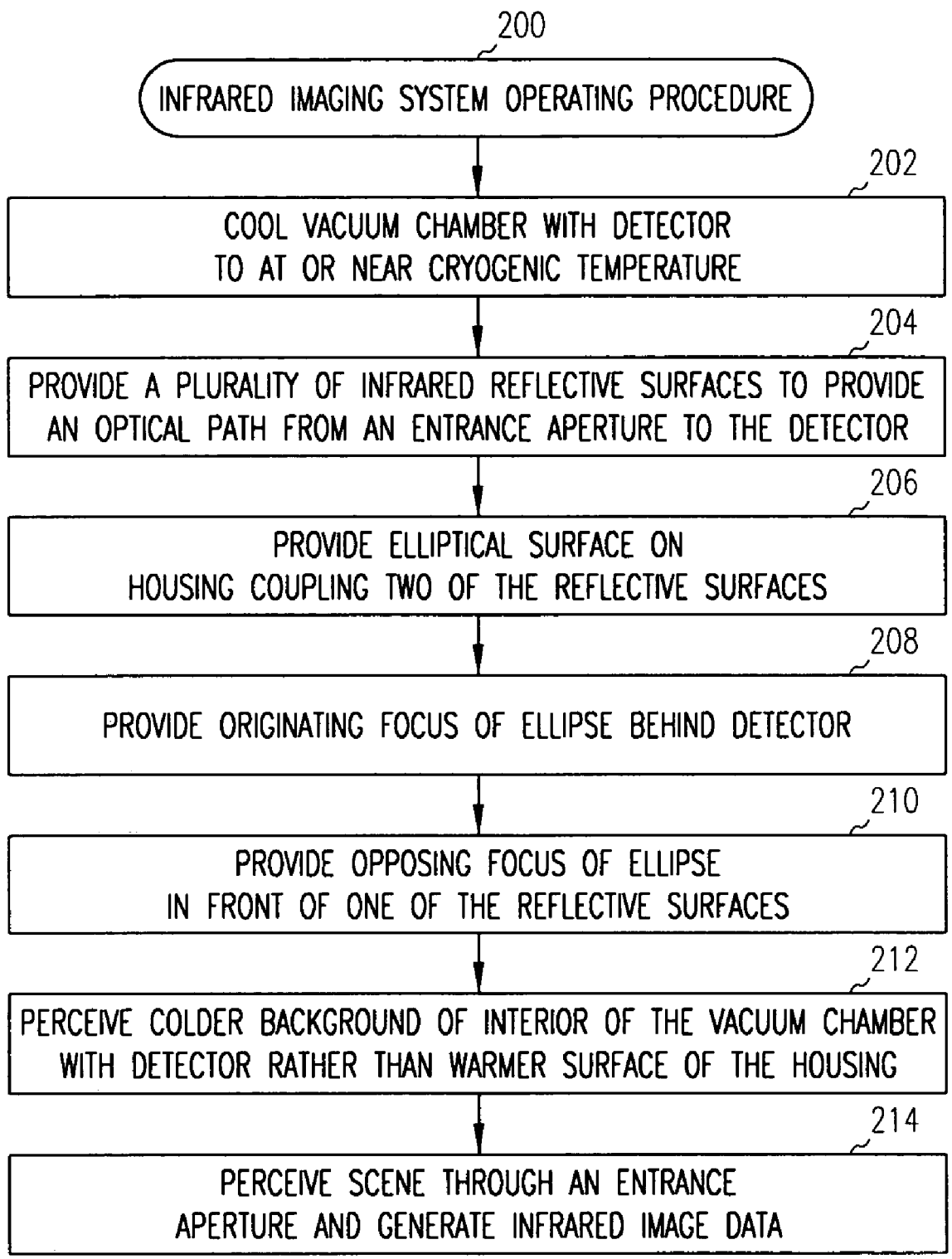
FIG. 2 is a flow chart of an infrared imaging procedure in accordance with some embodiments of the present invention.

FIG. 2 is a flow chart of an infrared imaging procedure in accordance with some embodiments of the present invention. Infrared imaging procedure 200 illustrates the operation of an infrared imaging system, such as system 100 (FIG. 1), although the scope of the invention is not limited in this respect.

In operation 202, a vacuum chamber, such as a Dewar, is provided with an infrared detector therein that can be cooled to at or near a cryogenic temperature. In some embodiments, vacuum chamber 112 (FIG. 1) may be provided with detector 110 (FIG. 1).

In operation 204, a plurality of infrared reflective surfaces may be provided to provide an optical path from an entrance aperture to the infrared detector. In some embodiments, reflective surfaces 102, 104, 106 and 108 (FIG. 1) may provide an optical path from entrance aperture 130 (FIG. 1) to detector 110 (FIG. 1).

In operation 206, a reflective elliptical surface may be provided on a housing coupling two of the reflective surfaces. In some embodiments, elliptical surface section 116 (FIG. 1) may be provided on a structure or housing 114 (FIG. 1) between reflective surfaces 106 and 108 (FIG. 1).

In operation 208, an originating focus of the elliptical surface may be provided behind the detector, and in operation 210, an opposing focus of the elliptical surface may be provided in front of one of the reflective surfaces. In some embodiments, originating focus 118 (FIG. 1) may be positioned behind detector 110 (FIG. 1) and opposing focus 120 (FIG. 1) may be positioned in front of reflective surface 108 (FIG. 1).

In operation 212, by virtue of the reflective elliptical surface, the infrared detector may perceive cooler background infrared radiation of the colder interior of the vacuum chamber rather than the infrared radiation emitted from a warmer surface of the housing or other structure.

In operation 214, the infrared detector may perceive a scene through the entrance aperture and may generate infrared image data substantially without the effects of the infrared radiation emitted from a warmer surface of the housing or other structure. The infrared image data may be used to detect and distinguish targets from a cold background, although the scope of the invention is not limited in this respect.

Although the individual operations of procedure 200 are illustrated and described as separate operations, one or more of the individual operations may be performed concurrently, and nothing requires that the operations be performed in the order illustrated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. An infrared imaging system comprising:
   an infrared detector within a vacuum chamber adapted to be cooled to at or near cryogenic temperatures;
   a plurality of reflective surfaces to provide an optical path to the detector; and
   a housing to couple two of the reflective surfaces, wherein the housing has an uncooled elliptical surface section between the two reflective surfaces.

2. The system of claim 1 wherein back-trace rays emanating from the detector are reflected off the elliptical surface section and into an interior of the vacuum chamber to allow the detector to perceive infrared radiation from the interior of the vacuum chamber rather than infrared radiation from the housing.

3. The system of claim 1 wherein the reflective surfaces comprise primary, secondary, tertiary and quaternary reflective surfaces to provide the optical path from an entrance aperture to the detector, and
   wherein the elliptical surface section is disposed on the housing between the tertiary and quaternary surfaces.

4. The system of claim 3 wherein the elliptical surface section is part of an ellipsoid,
   wherein an originating focus of the ellipsoid is behind and offset from a surface of the detector, and
   wherein an opposing focus of the ellipsoid is in front of the quaternary surface.

5. The system of claim 4 wherein the reflective surfaces, the elliptical surface section, the focuses, and a vacuum chamber opening are positioned such that a back-trace ray emanating from the detector and extending to the elliptical surface section is reflected from a first portion the elliptical surface section to a second portion on the elliptical surface section and is redirected toward the originating focus, the ray being intercepted by the interior of the vacuum chamber to allow the detector to perceive the interior of the vacuum chamber.

6. The system of claim 1 wherein due to ellipsoidal properties of the elliptical surface section, infrared emissions from the elliptical surface section perceived by the detector are reflected to an interior of the vacuum chamber to allow the detector to perceive interior of the vacuum chamber rather than infrared emissions of the housing.

7. The system of claim 1 wherein the vacuum chamber comprises a Dewar that is adapted to be cooled to either at or near cryogenic temperatures,
   wherein the vacuum chamber is to maintain the infrared detector at or near a cryogenic temperature.

8. The system of claim 1 wherein the plurality of reflective surfaces and the elliptical surface section are infrared reflective surfaces comprising at least one of gold, silver and aluminum plating.

9. The system of claim 8 wherein the plurality of reflective surfaces comprise sections of one of either spherical, conical or aspherical surfaces.

10. The system of claim 1 wherein the detector generates output signals representing images of a scene perceived through an entrance aperture,
    the system further comprising circuitry to analyze the output signals for use in identifying and distinguishing targets in the scene from a background.

11. A method of generating an infrared image comprising:
    cooling a vacuum chamber to at or near cryogenic temperatures, the vacuum having an infrared detector positioned therein;
    positioning a plurality of reflective surfaces to provide an optical path to the detector from an entrance aperture;
    coupling two of the reflective surfaces with a housing having an uncooled elliptical surface section between the two reflective surfaces; and
    perceiving a scene through the optical path by the detector without perceiving infrared radiation from at least part of the housing.

12. The method of claim 11 wherein the detector perceives infrared radiation from the interior of the vacuum chamber rather than infrared radiation from the housing, the elliptical surface being provided wherein rays emanating from the detector are reflected off the elliptical surface section and into an interior of the vacuum chamber.

13. The method of claim 12 wherein the reflective surfaces comprise primary, secondary, tertiary and quaternary reflective surfaces to provide the optical path from the entrance aperture to the detector, and
    wherein the elliptical surface section is disposed between the tertiary and quaternary surfaces.

14. The method of claim 13 wherein the elliptical surface section is part of an ellipsoid, and wherein the method further comprises:
    positioning an originating focus of the ellipsoid behind and offset from a surface of the detector; and
    positioning an opposing focus of the ellipsoid in front of the quaternary surface.

15. An infrared target detection and identification system comprising:
    an infrared imaging system that generates detection output signals from infrared radiation detected from a scene; and
    a circuitry to identify and distinguish targets in the scene from a cold background from the detection output signals,
    wherein the infrared imaging system comprises:
    an infrared detector within a vacuum chamber adapted to be cooled to at or near cryogenic temperatures;
    a plurality of reflective surfaces to provide an optical path to the detector; and
    a housing to couple two of the reflective surfaces, wherein the housing has an uncooled elliptical surface section between the two reflective surfaces.

16. The system of claim 15 wherein rays emanating from the detector are reflected off the elliptical surface section and into an interior of the vacuum chamber to allow the detector to perceive infrared radiation from the interior of the vacuum chamber rather than infrared radiation from the housing.

17. The system of claim 16 wherein the reflective surfaces comprise primary, secondary, tertiary and quaternary reflective surfaces to provide the optical path from an entrance aperture to the detector, and wherein the elliptical surface section is disposed on the housing between the tertiary and quaternary surfaces.

18. The system of claim 16 wherein the elliptical surface section is part of an ellipsoid, wherein an originating focus of the ellipsoid is behind and offset from a surface of the detector, and wherein an opposing focus of the ellipsoid is in front of one of the reflective surfaces.

19. The system of claim 18 wherein the target detection system is satellite-based to detect and distinguish missiles.

* * * * *

UNITED STATES PATENT AND TRADEMARK OFFICE
CERTIFICATE OF CORRECTION

| | | |
|---|---|---|
| PATENT NO. | : 7,180,067 B2 | Page 1 of 1 |
| APPLICATION NO. | : 11/059159 | |
| DATED | : February 15, 2005 | |
| INVENTOR(S) | : Jeff S. Wolske | |

It is certified that error appears in the above-identified patent and that said Letters Patent is hereby corrected as shown below:

In the specification on page 1, below the title, insert the following

--This invention was made, at least in part, with Government support under Contract No. HQ0006-01-C-0001 awarded by the United States Department of Defense. The Government may have certain rights in this invention.--

Signed and Sealed this

First Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,180,067 B2 | Page 1 of 1 |
| APPLICATION NO. | : 11/059159 | |
| DATED | : February 20, 2007 | |
| INVENTOR(S) | : Jeff S. Wolske | |

It is certified that error appears in the above-identified patent and that said Letters Patent is hereby corrected as shown below:

In the specification on page 1, below the title, insert the following

--This invention was made, at least in part, with Government support under Contract No. HQ0006-01-C-0001 awarded by the United States Department of Defense. The Government may have certain rights in this invention.--

This certificate supersedes Certificate of Correction issued May 1, 2007.

Signed and Sealed this

Twenty-second Day of May, 2007

JON W. DUDAS
*Director of the United States Patent and Trademark Office*